US006271860B1

(12) United States Patent
Gross

(10) Patent No.: US 6,271,860 B1
(45) Date of Patent: Aug. 7, 2001

(54) METHOD AND SYSTEM FOR DISPLAY OF AN ADDITIONAL DIMENSION

(76) Inventor: David Gross, 161 Gilat, Negev Circuit Mail 85105 (IL)

( * ) Notice: Subject to any disclaimer, the term of this patent is extended or adjusted under 35 U.S.C. 154(b) by 0 days.

(21) Appl. No.: 09/120,764

(22) Filed: Jul. 22, 1998

(30) Foreign Application Priority Data

Jul. 30, 1997 (IL) .......................................... 121431

(51) Int. Cl.$^7$ .................................................. G06T 11/40
(52) U.S. Cl. ........................................ 345/431; 345/427
(58) Field of Search ..................................... 345/259, 427, 345/431, 440, 419, 442, 443; 395/118, 140

(56) References Cited

U.S. PATENT DOCUMENTS

| | | | | |
|---|---|---|---|---|
| 4,361,830 | * | 11/1982 | Honma et al. ............... | 340/146.3 |
| 5,007,001 | | 4/1991 | Llyod-Williams ............... | 364/518 |
| 5,228,119 | * | 7/1993 | Mihalisin et al. ............... | 395/118 |
| 5,408,596 | * | 4/1995 | Nonaka ............................ | 395/140 |
| 5,473,736 | * | 12/1995 | Young ............................... | 395/131 |
| 5,537,119 | | 7/1996 | Poore, Jr. ........................ | 342/96 |
| 5,570,460 | | 10/1996 | Ramanujam ..................... | 395/124 |
| 5,739,824 | * | 4/1998 | Dietrich et al. ................. | 345/440 |
| 5,794,178 | * | 8/1998 | Caid et al. ....................... | 704/9 |
| 5,835,099 | * | 11/1998 | Marimount ...................... | 345/431 |
| 5,943,058 | * | 8/1999 | Nagy ............................... | 345/430 |
| 5,986,673 | * | 11/1999 | Martz ............................... | 345/437 |

FOREIGN PATENT DOCUMENTS

9504140 * 9/1995 (GB) .

* cited by examiner

*Primary Examiner*—Matthew Luu
*Assistant Examiner*—G. F. Cunningham
(74) *Attorney, Agent, or Firm*—Reed Smith LLP

(57) ABSTRACT

A method AND A SYSTEM for displaying in an N-dimensional display means the $N+1^{st}$ dimension of an equation of N+1 variables, comprising converting the equation into the form inwhich the $N+1^{st}$ dimension is a variable that is a function of the other first N variables, computing, by means of the function, the scalar value of each pixel, whose N coordinates represent the specific values of the first N variables, and coloring or shading the pixel according to a predetermined color pattern bywhich the scalar value conforms to a predetermined color or shading. The N dimensional display may comprise 2 or 3 dimensions and may include a computer screen, a TV monitor, a print on a printable substrate a hologram, a holographic screen, a stereoscopic TV or video display, or another two or three dimensional display means. The predetermined color pattern may be the pattern defined by the manufacturer of the computer or of the display means.

19 Claims, 8 Drawing Sheets

METHOD AND SYSTEM FOR DISPLAY OF AN ADDITIONAL DIMENSION

FIELD OF THE INVENTION

This invention relates to a method and a system for display of functions in general, and to display of a third or fourth dimension in a two dimensional computer interface display in particular.

BACKGROUND OF THE INVENTION

The digital display of three dimensional objects in a conventional two dimensional screen or printable substrate is possible in several ways. The most instructive display is usually made possible by an isometric-perspective representation. However, such a presentation, when required to be computed by a suitable software involves complicated computations that consume precious computing time, memory, hardware, complicated software and other scarce computer resources. In addition, in a perspective view the "rear" parts or surfaces of the object are always hidden behind the frontal parts. Moreover, for many purposes, the display may be reduced to a simplified top, bottom or side view, inwhich two Cartesian dimensions are represented by the X-Y raster display of the screen or the substrate, and "depths" and "heights" of the third Z dimension or coordinate are represented by altitude lines or coloring. Such a display is relatively economical in the consumption of scarce computer resources and since only one "surface" is shown, it seldom leaves hidden parts or surfaces when presented from an appropriate angle.

The conventional way by which a surface view is computed, is by computing the values of the third dimension of each pixel, and drawing equivalence lines, whereby each equivalence line represents equivalent "height" or "depth". For enhancing the view, it is common to provide coloring or shadowing characteristics to the lines or the areas between them. Shadowing or coloring which are relative to the abruptness of steep slopes or density of equivalence lines is another possible representation, once such equivalence lines are computed and defined. Nevertheless, the computing of such equivalence line still requires substantial computing resources as well as the determination of the coloring or the shadowing.

It is therefore an object of the invention present to provide a novel method and device for displaying a third dimension of an object or a surface.

It is another object of the present invention to provide a method and device for use in conjunction of conventional computer monitor, TV screen, digital print on a printable substrate, or other two or three dimensional display means.

It is a further object of the invention, to provide a method and a device for displaying a fourth or a fifth dimension of an object, in a two or three dimensional display means, correspondingly.

Yet, a further object of the present invention is to provide a method and a device for defining by a single step the coloring or shading of each pixel for a given function representing an "object", without computing equivalence lines of the object.

It is yet another object of the present invention to provide a method and a device for displaying on an N-dimensional displaying means, a further "N+1" dimension or further "N+2" dimensions.

Still, another object of the invention is to provide a method and a device that will involve, minimal computing steps, and will use minimal computer resources.

It is still a further object of the invention to provide a method and a device that will adapt for use with the conventional hardware or software bywhich each numerical value has a pre-defined coloring or shading.

These and other objectives are provided by the invention described below.

SUMMARY OF THE INVENTION

There is thus provided according to the present invention a method for displaying in an N-dimensional display means the $N+1^{st}$ dimension of an equation of N+1 variables, comprising converting the equation into the form inwhich the $N+1^{st}$ dimension is a variable that is a function of the other first N variables, computing, by means of the function, the scalar value of each pixel, whose N-coordinates represent the specific values of the first N variables, and coloring or shading the pixel according to a predetermined color pattern by which the scalar value conforms to a predetermined color or shading. The N dimensional display may comprise 2 or 3 dimensions and include a computer screen, a TV monitor, a print on a printable substrate a hologram, a holographic screen, a stereoscopic TV or video display, or another two or three dimensional display means.

Preferably, the function is a function of N Cartesian variables, whereby each variable of the N variables represents the coordinate of the specific value computed for the $N+1^{st}$ variable. Further preferably, the predetermined color pattern is the pattern defined by the manufacturer of the computer or of the display means, and may define the coloring corresponding to discrete values, wherein the coloring of values between the discrete values may be either defined by color corresponding to the closest discrete value or uncolored.

For a given first function of N+1 variables, the method for displaying the $N+1^{st}$ dimension in an N-dimensional display means may comprise converting the first function into the form bywhich the $N+1^{st}$ variable is a second function of the first N variables, computing, by the second function, the scalar value of each pixel, whose N-coordinates represent the specific values of the first N variables, and coloring or shading the pixel according to a predetermined color pattern bywhich each scalar value conforms to a predetermined color or shading.

According to another feature of the invention, the method for displaying in an N-dimensional display means the $N+2^{nd}$ dimension of an equation of N+2 variables, comprises converting the equation into the form inwhich the $N+2^{nd}$ dimension is a variable that is a function of the other first N+1 variables, computing, by means of the function, the scalar value of each pixel, whose N+1 coordinates represent the specific values of the first N+1 variables, computing, by means of a predetermined isometric function, the deviation of each pixel from its first N coordinates to altered first N coordinates and eliminating each pixel that is determined by the isometric function as hidden behind a frontal pixel, and coloring or shading the pixel, if the pixel is not eliminated in step C, according to a predetermined color pattern bywhich the scalar value conforms to a predetermined color or shading.

According to another aspect of the invention there is provided a system for displaying the $N+1^{st}$ dimension of an equation of N+1 variables in an N-dimensional display means, comprising interface means for receiving input concerning the equation, conversion means for converting the equation into the form inwhich the $N+1^{st}$ dimension is a variable that is a function of the other first N variables, computing means for computing, by means of the function, the scalar value of each pixel, whose N-coordinates represent the specific values of the first N variables, coloring means for coloring or shading the pixel according to a predetermined color pattern bywhich the scalar value conforms to a predetermined color or shading, and an N dimensional display means comprising a display interface, or storage or transmittal means adapted to instruct such display interface, wherein, the color or shade of each pixel in the display means is determined by the coloring means.

For a given first function of N+1 variables, the system comprises interface means for receiving input concerning the equation, conversion means for converting the first function into the form bywhich the N+1$^{st}$ variable is a second function of the first N variables, computing means for computing, by means of the second function, the scalar value of each pixel, whose N-coordinates represent the specific values of the first N variables, coloring means for coloring or shading the pixel according to a predetermined color pattern bywhich the scalar value conforms to a predetermined color or shading, and an N dimensional display means comprising a display interface, or storage or transmittal means adapted to instruct such display interface, wherein, the color or shade of each pixel in the display means is determined by the coloring means.

According to another feature of the invention, there is provided a system for displaying the N+2$^{nd}$ dimension of an equation of N+2 variables in an N-dimensional display means, comprising interface means for receiving input concerning the equation, conversion means for converting the equation into the form inwhich the N+2$^{nd}$ dimension is a variable that is a function of the other first N+1 variables, first computing means for computing, by means of the function, the scalar value of each pixel, whose N+1 coordinates represent the specific values of the first N+1 variables, second computing means for computing, by means of a predetermined isometric function, the deviation of each pixel from its first N coordinates to altered first N coordinates and eliminating each pixel that is determined by the isometric function as hidden behind a frontal pixel, coloring means for coloring or shading the pixel according to a predetermined color pattern bywhich the scalar value conforms to a predetermined color or shading, and an N dimensional display means comprising a display interface, or storage or transmittal means adapted to instruct such display interface, wherein, the color or shade of each pixel, if the pixel is not eliminated by the second computing means, in the display means, is determined by the coloring means.

BRIEF DESCRIPTION OF THE INVENTION

The present invention will be further understood and appreciated from the following detailed description, taken in conjunction with the following enclosed drawings inwhich like numerals designate correspondingly analogous elements or sections throughout, and inwhich:

DETAILED DESCRIPTION OF THE INVENTION

Figure 1:
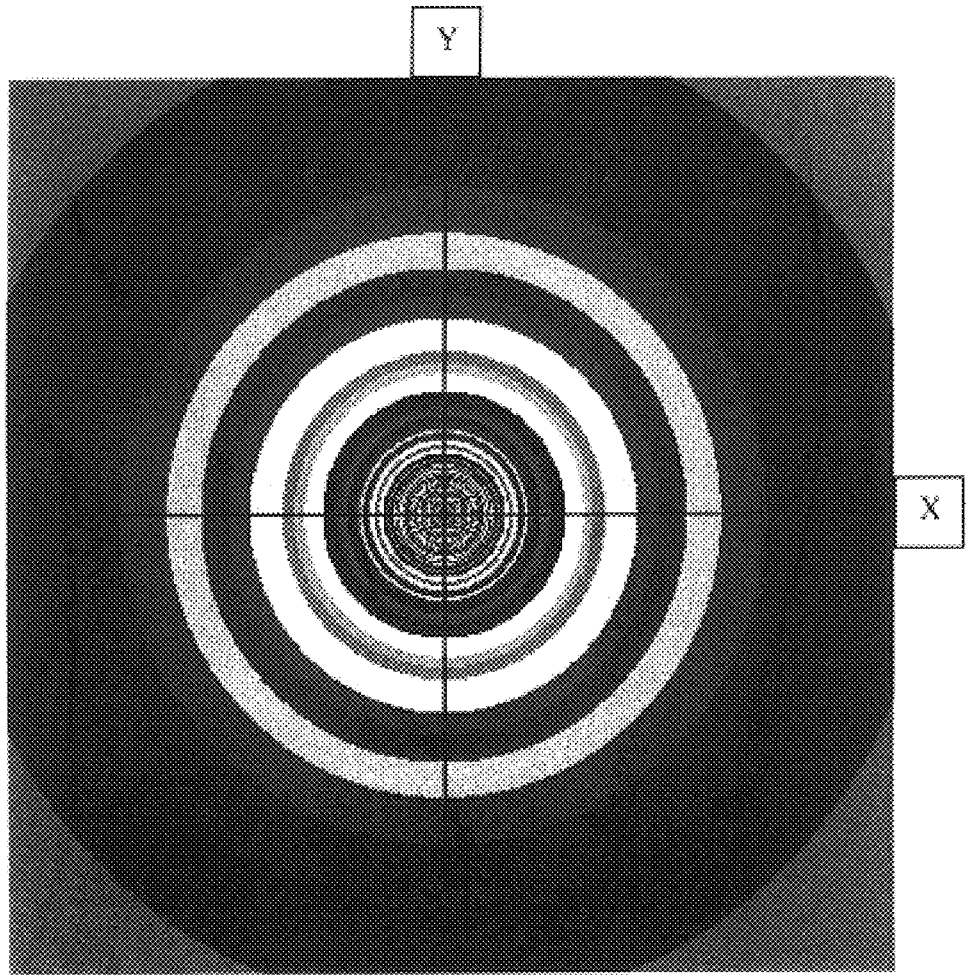
FIG. 1 is a pictorial illustration of an image of a function displayed according to the invention.

The invention is primarily directed to make use of conventional computer screen or video signal that is adapted to produce images on a screen—or a corresponding print—or other interface means, which screen includes a plurality of horizontal lines. Each line contains a plurality of points, otherwise known as pixels, which may be colored or shaded, as known in the art. The screen is two dimensional, and the display of the third dimension of a three dimensional object may be presented, according to one possibility, by the drawing of "altitude" lines, whereby each line is defined by a discrete scalar value of the "altitude" in the third dimension. Thus, a "map" of the object may be displayed. However, such a map is often hard to read and understand, especially when the displayed "object" defines the surface of a mathematical function, whose shapes are not familiar to the eye. The coloring of each pixel so as to continuously color the object with altitude oriented stripes is much more illustrative. For this purpose, it may be particularly simple to use the coloring pattern defined by the manufacturer of the computer, TV, video or screen involved. Conventionally, the manufacturer designates in series an invariable sequence of 16 or 256 or other number of colors or shades to scalar values for purposes which may be beyond the scope of this invention. The mating values usually comprise whole "natural" numbers (negative or positive) arranged in series and the colors of the sequence are repeatedly applied thereto in succession. For example, the first color of a sequence of 16 colors may be designated to '0', the second color to '1' and '−15', the sixteenth color to '15' and '−1', the first color applied also to '16', '32', '48', and so forth. The colors or shades may be restricted to shades of black, white and gray, in black and white appliances. Fractional numbers or scalar values between the whole numbers are simply rounded to the closest whole number and receive its coupled color. Refinement of the striping may be accomplished by a simple multiplication of the function with a suitable factor. Alternatively, the pixels having values between the discrete values may bee uncolored to display altitude lines only.

For example, in a given equation of three variables inwhich the third variable is a function of the other first 2 variables, the specific values of the two variables will define the coordinates of each pixel of the function in the screen. By computing, by means of the function, the scalar value of the third variable, and coloring or shading the pixel according to the predetermined color pattern bywhich the scalar value of the third variable conforms to the predetermined color or shading, such as the one described above, and repeating this for each pixel in the screen, a full altitude striped map of the "surface" represented by the function will appear on the screen.

Some examples of the above described method are shown in FIGS. 1 to 4. The equations were selected to be similar to equations that describe the "electric" field distribution between electric "charges"—a popular subject in books, print-outs and screen displays. A general simplified form of equation for m "charged" particles having a unitary positive or negative charge is of the form (in polar coordinates):

$$z = f(r) = \sum_{i=1}^{m} \pm 1/(r + a_i)$$

and in Cartesian coordinates:

$$z = f(x, y) = \sum_{i=1}^{m} \pm 1 \bigg/ \sqrt{[(x+a_i)^2 + (y+b_i)^2]}$$

wherein $a_i$ or $b_i$, respectively, represent the displacement of each charge i from the center of the coordinate system and the sign ± is either negative or positive depending on the charge i.

Figure 2:
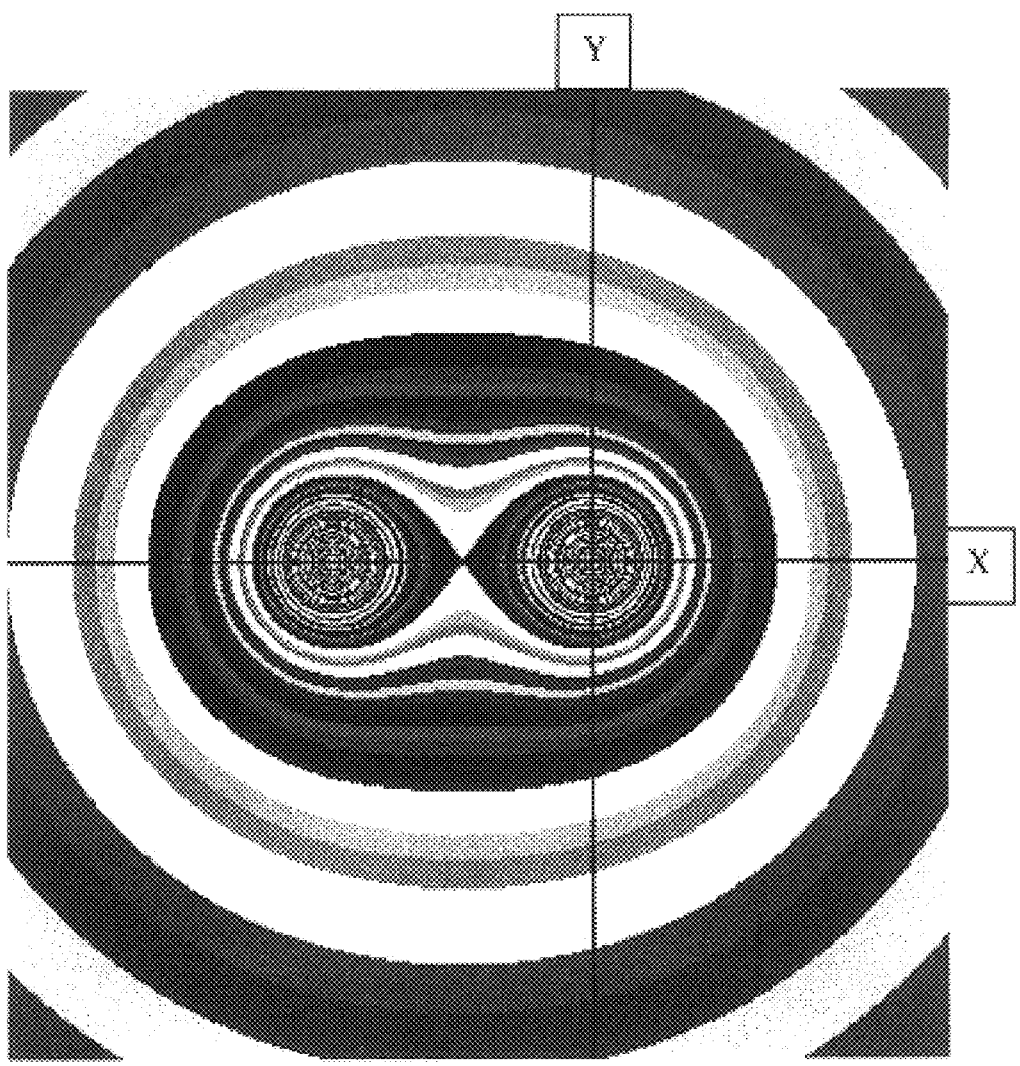
FIG. 2 is a pictorial illustration of another image of a function displayed according to the invention.
Figure 3:
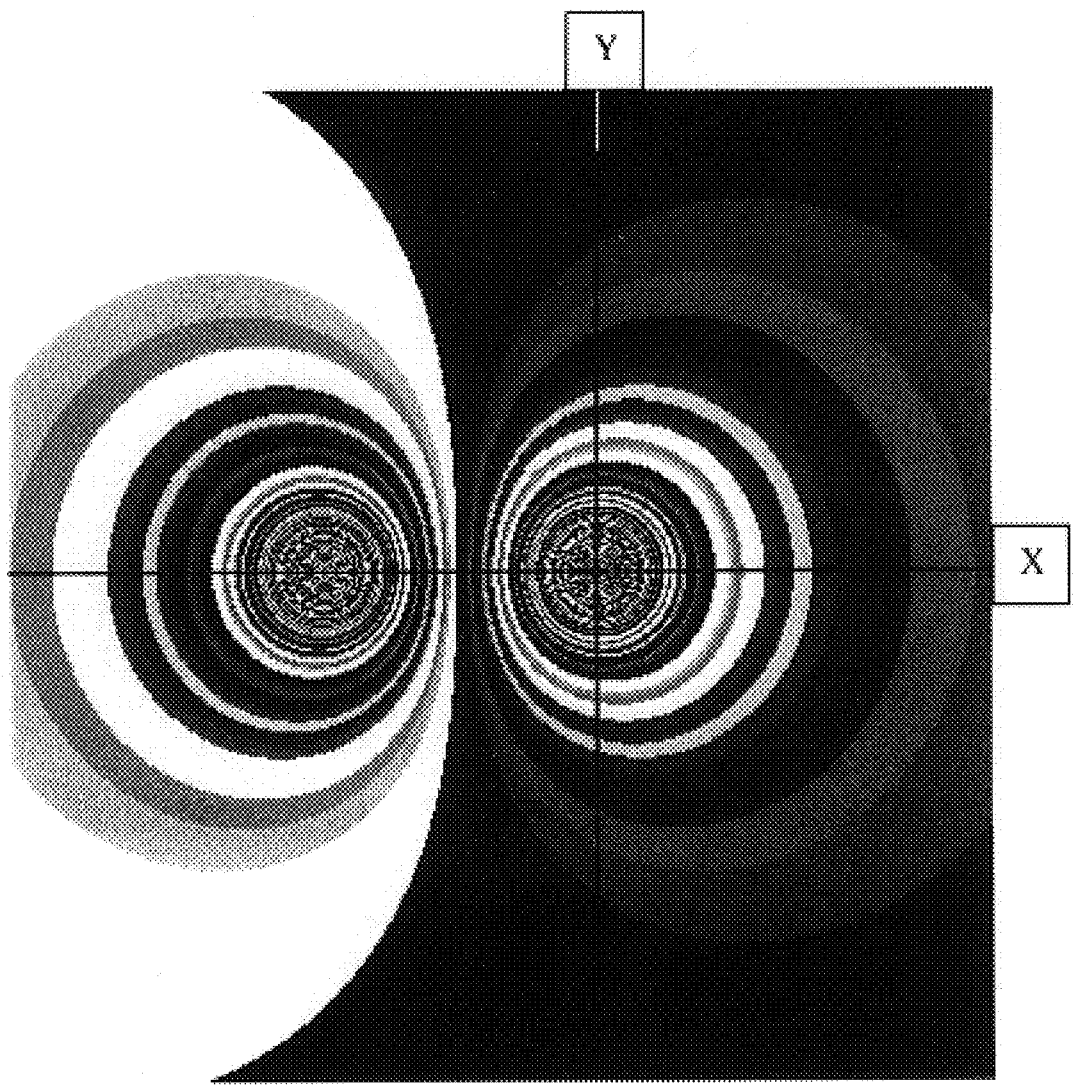
FIG. 3 is a pictorial illustration of a further image of a function displayed according to the invention.
Figure 4:
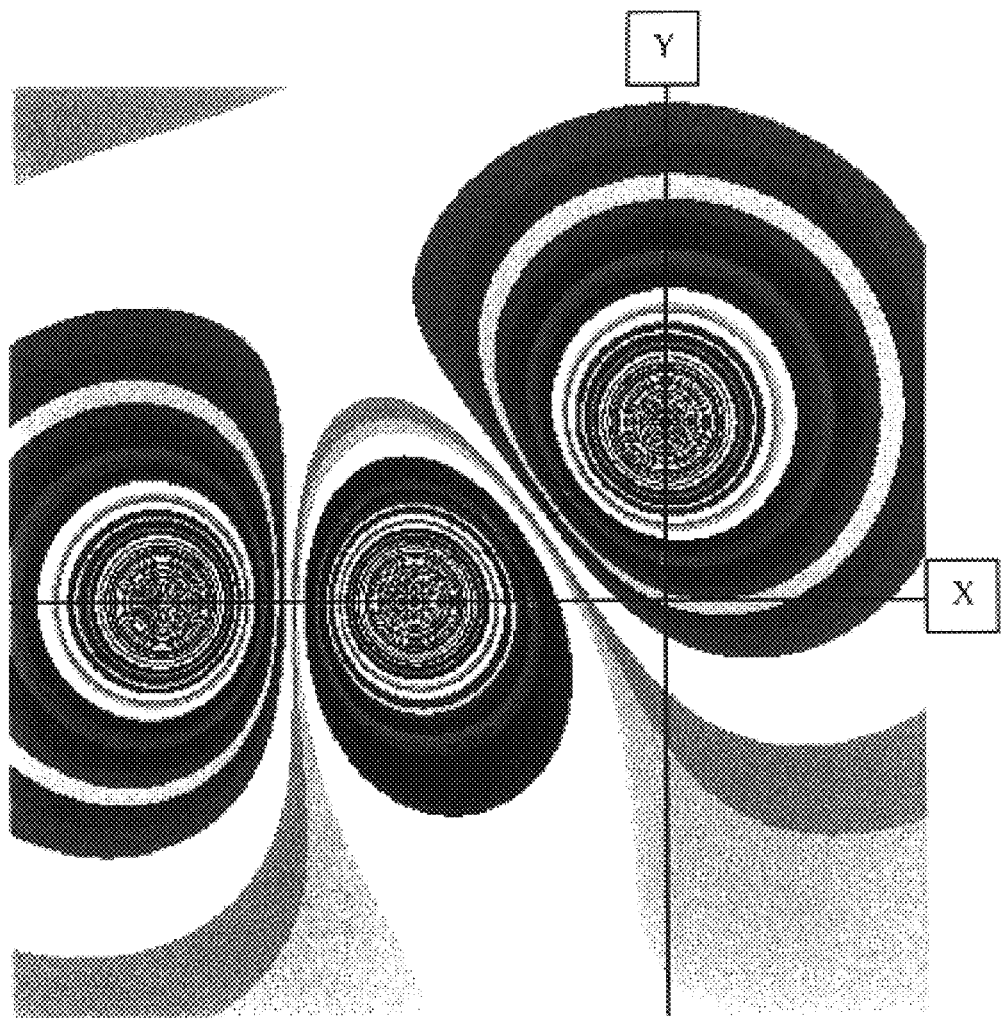
FIG. 4 is a pictorial illustration of yet a further image of a function displayed according to the invention.
Figure 5:
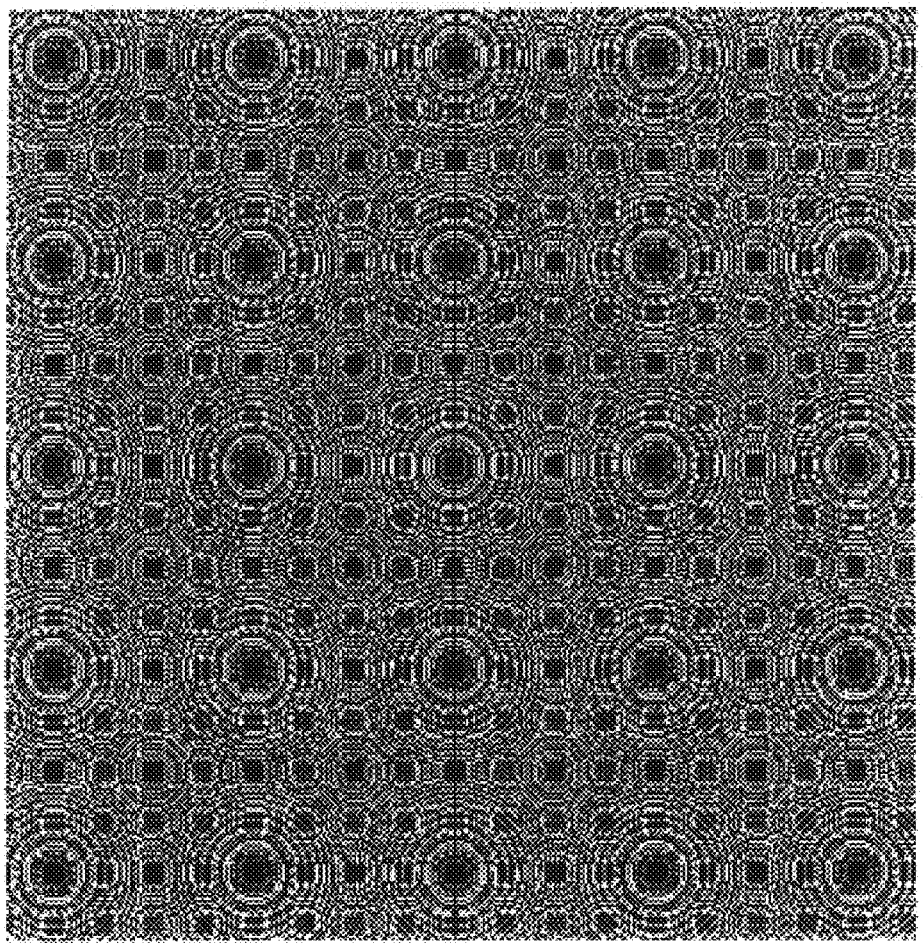
FIG. 5 is a pictorial illustration of yet a further image of a function displayed according to the invention.

Thus, the function in FIG. 1 represents the surface of $z=1/\sqrt{(x^2+y^2)}$ in Cartesian coordinates (or $z=1/r$ in polar coordinates). The colors were reduced to shades of black, white and gray in all the enclosed drawings. Each shaded stripe in FIG. 1 represents an area of equi-potential "charge" imposed by the electric field of the single charge located in center of the coordinates. The "zero" X and "zero" Y coordinates were illustrated by dark grid lines. The function in FIG. 2 represents the field created by two identical charges and is represented by $z=1/\sqrt{(x^2+y^2)}+1/\sqrt{[(x-a)^2+y^2)]}$ in Cartesian coordinates. The function in FIG. 3 represents the field created by two opposed charges and is represented by $z=1/\sqrt{(x^2=y^2)}-1/\sqrt{[(x-a)^2+y^2)]}$ in Cartesian coordinates. The function in FIG. 4 represents the field created by three similar charges and is represented by $z=1/\sqrt{[x^2+(y-a_1)^2]}+1/\sqrt{[(x+b_2)^2+y^2)]}+1/\sqrt{[(x+b_3)^2+y^2)]}$ in Cartesian coordinates. The function in FIG. 5 represents the field created by a multiplicity of charges arranged in a single layer of lattice "crystal" and is represented by the general equation described above with specific consistent displacements.

The invention was described in respect of two dimensional display. The display means may include a computer screen, a TV monitor, a print on a printable substrate or another two dimensional display means. However it will be appreciated that the invention is not limited to two dimensions or any number of dimensions. Three dimensional display means are known and may include a hologram, a holographic screen, a stereoscopic TV or video display, a stereoscopic print on a printable substrate or another three dimensional display means.

Therefore, the generalization of the above examples provides a method for displaying in an N-dimensional display means the N+1$^{st}$ dimension of an equation of N+1 variables, comprising the following steps: converting the equation into the form inwhich the N+1$^{st}$ dimension is a variable that is a function of the other first N variables, computing, by means of the function, the scalar value of each pixel, whose N-coordinates represent the specific values of the first N variables, and coloring or shading the pixel according to a predetermined color pattern bywhich the scalar value conforms to a predetermined color or shading. The above conversions and computations may be operated by suitable means such as a designated CPU, processing means, or software.

The elimination of the N+1$^{st}$ variable by said conversion is a mathematical task that may be achieved by any means or known method. The computing of the scalar value is a task that may be typically computed by a suitable computer or processor. It may be preferable for raster type display that non-Cartesian function will be normalized so as to fit to the display mode by which the first N variables represent the N coordinates of the display means, or the function is a function of N Cartesian variables, whereby each variable of the N variables represents the coordinate of the specific value computed for the N+1$^{st}$ variable. The normalization of the function is a mathematical task and may be achieved by any means or known method.

The display of a further dimension may be provided by conventional methods by which an isometric or perspective characteristics are added to the N-dimensional display. Accordingly, a predetermined "isometric" function is used to compute the deviation of each pixel from its first N coordinates to altered first N coordinates and eliminating each pixel that is determined by the isometric function as hidden behind a frontal pixel. Such deviation may be considered as the "N+1 $^{st}$" coordinate, since it depends on an extra variable. The coloring or shading may be conducted as explained above, whereby the coloring or shading is computed from the N+2$^{nd}$ variable that is a function of the former N+1 variables.

Figure 6:
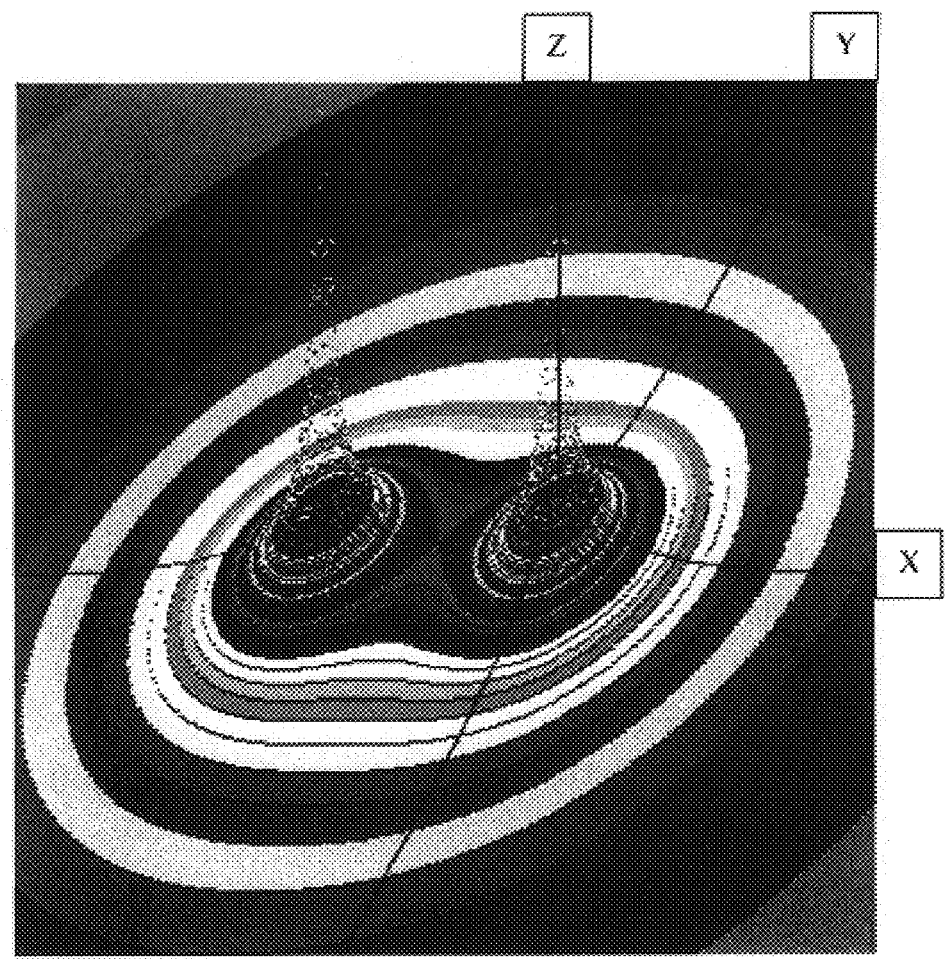
FIG. 6 is a pictorial illustration of the image of the function of FIG. 2, displayed in accordance with another feature of the invention.

In other words, in an N-dimensional display means the N+2$^{nd}$ dimension of an equation of N+2 variables, is derived by converting the equation into the form inwhich the N+2$^{nd}$ dimension is a variable that is a function of the other first N+1 variables, and computing, by means of the function, the scalar value of each pixel, whose N+1 coordinates represent the specific values of the first N+1 variables. The deviation of each pixel from its first N coordinates to altered first N coordinates and eliminating each pixel that is determined by the isometric function as hidden behind a frontal pixel is computed, by means of a predetermined isometric function. As before, coloring or shading the pixel, if the pixel is not eliminated in step C, is done according to a predetermined color pattern bywhich the scalar value conforms to a predetermined color or shading. It will be appreciated that in some cases, it may be desired to use the latter method to present an N+1 dimensions in an N-dimensional display means, whereby the N+1$^{st}$ dimension is illustrated both by the computed isometric deviation and by the coloring or shading. In such cases the color or shade corresponds to the isometric deviation. For example, in reference to FIG. 6, the same function of FIG. 2, which is 3 dimensional, is shown on a 2 dimensional printout with the shading corresponding to the isometric deviation.

Figure 7A:
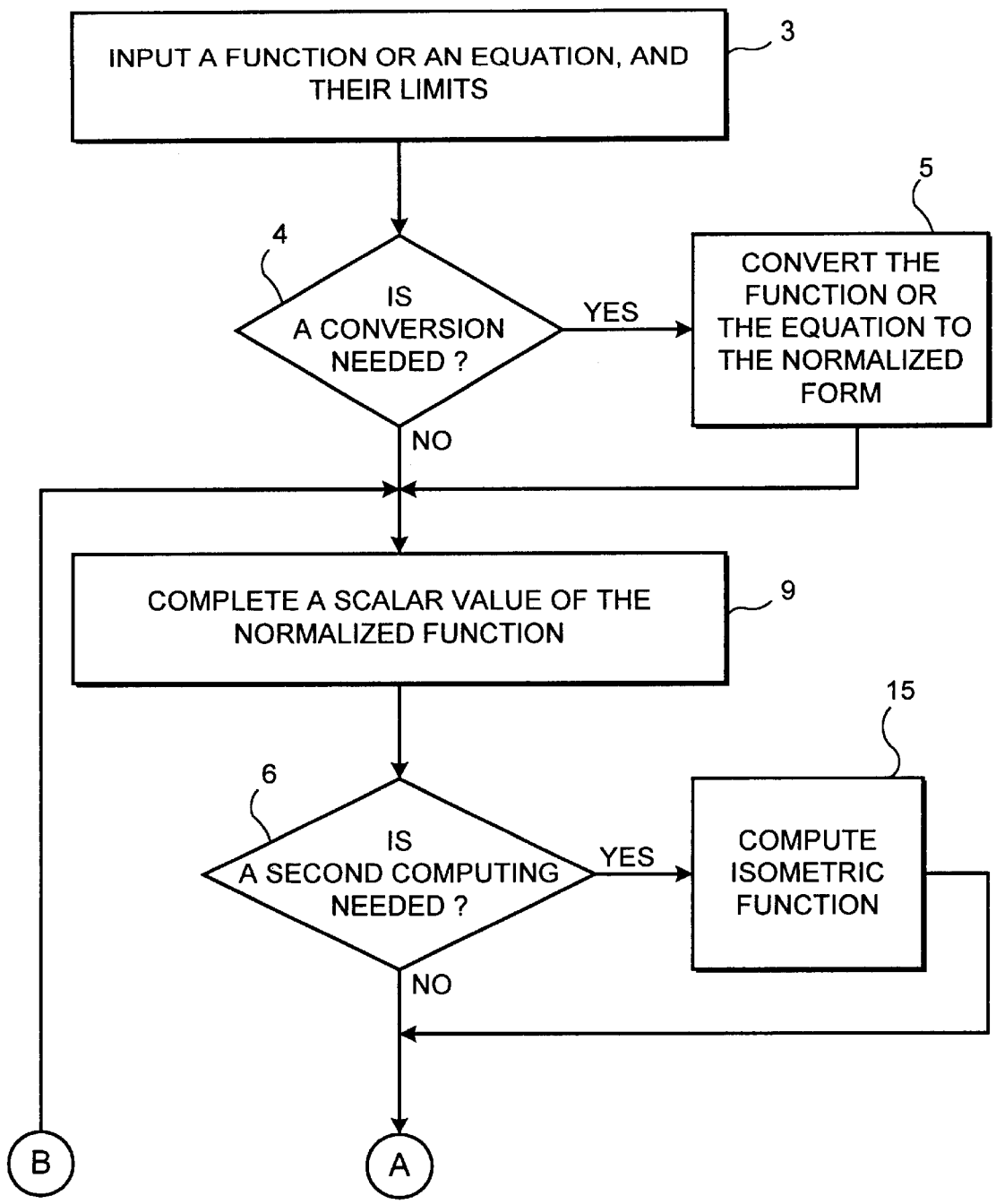
FIG. 7 is a block diagram of a system constructed and operative in accordance with the invention.
Figure 7B:
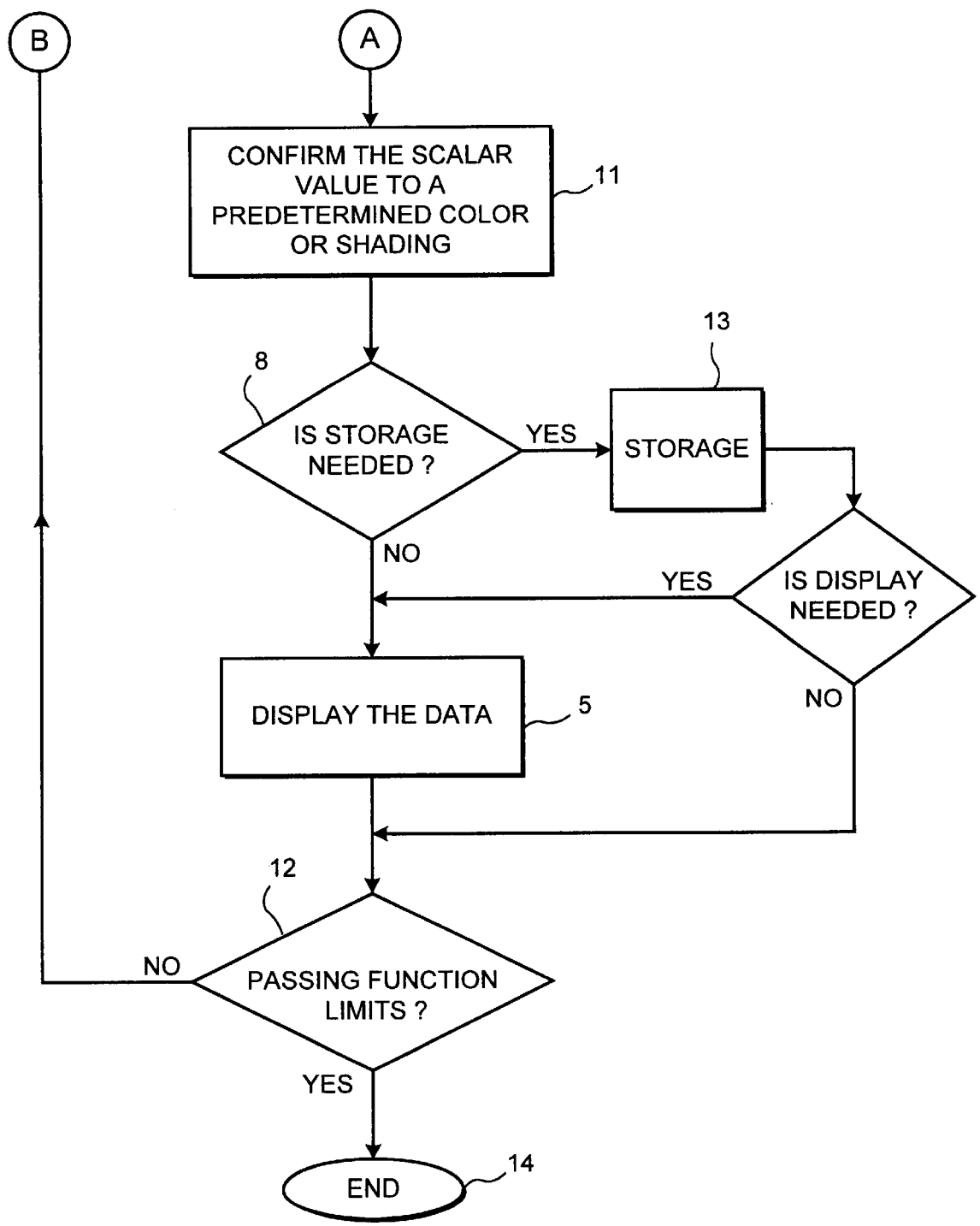

Referring now to FIG. 7, a system 1 for displaying the N+1$^{st}$ dimension of an equation of N+1 variables, which is constructed and operative according to the invention, will thus comprise interface means 3 into which the operator inserts the data or input required, such as the equation or function to be presented in an N-dimensional display means 5. The inserted data is then processed, if necessary, in conversion means 7 for converting the equation into the "normalized" form inwhich the N+1$^{st}$ dimension is a variable that is a function of the other first N variables. In case the data input already includes a normalized form the use of conversion means is skipped or eliminated. the next stage, the data is processed in computing means 9 for computing, by means of the function, the scalar value of each pixel, whose N-coordinates represent the specific values of the first N variables. The pixel is colored or shaded according to a predetermined color pattern represented by color or shade definition means 11, bywhich the scalar value conforms to a predetermined color or shading. The output is then either displayed in display means 5 or transmittal or storage or other interface means 13. In the case wherein N+2 variables, comprising are displayed in an N dimensional display the system is similar, with the addition of a second computing means 15 for computing, by means of a predetermined isometric function, the deviation of each pixel from its first N coordinates to altered first N coordinates and eliminating each pixel that is determined by the isometric function as hidden behind a frontal pixel.

It will be appreciated by those skilled in the art that the invention is not limited to what has been shown and described hereinabove by way of example. Rather, the scope of the invention is limited solely by the claims which follow.

What is claimed is:

1. A method for displaying in an N-dimensional display means including two or three dimensions of the $N+1^{st}$ dimension of a function of N+1 variables, comprising the following steps:
    A. converting the function into a form in which the $N+1^{st}$ dimension is a variable that is a function of the other first N variables and starts from a lower function and goes upwardly;
    B. computing directly, by means of said function, the scalar value of each pixel, whose N-coordinates represent the specific values of said first N variables, producing a function for each said pixel; and
    C. coloring or shading said pixel according to a predetermined color pattern by which said scalar value conforms to a predetermined color or shading.

2. A method as in claim 1, wherein said display means include a computer screen, a TV monitor, a print on a printable substrate or another two dimensional display means.

3. A method as in claim 1, wherein said display means include a hologram, a holographic screen, a stereoscopic TV or video display, a stereoscopic print on a printable substrate or another three dimensional display means.

4. A method as in claim 1, wherein said function is a function of N Cartesian variables, whereby each variable of said N variables represents the coordinate of the specific value computed for the $N+1^{st}$ variable.

5. A method as in claim 1, wherein said predetermined color pattern is the pattern defined by the manufacturer of the display means.

6. A method as in claim 1, wherein said predetermined color pattern is defined by the coloring corresponding to discrete values.

7. A method as in claim 6, wherein the coloring of values between said discrete values is defined by color corresponding to the closest discrete value.

8. A method as in claim 6, wherein the pixels having values between said discrete values are uncolored.

9. A method for displaying the $N+1^{st}$ dimension in an N-dimensional display means including two or three dimensions of a first function of N+1 variables, comprising the following steps:
    A. converting said first function into the form by which the $N+1^{st}$ variable is a second function of the first N variables;
    B. computing, by said second function, the scalar value of each pixel, whose N-coordinates represent the specific values of said first N variables; and
    C. coloring or shading said pixel according to a predetermined color pattern by which each scalar value conforms to a predetermined color or shading.

10. A method for displaying in an N-dimensional display means including two or three dimensions the $N+2^{nd}$ dimension of an equation of N+2 variables, comprising the following steps:
    A. converting said equation into the form in which the $N+2^{nd}$ dimension is a variable that is a function of the other first N+1 variables;
    B. computing, by means of said function, the scalar value of each pixel, whose N+1 coordinates represent the specific values of said first N+1 variables;
    C. computing, by means of a predetermined isometric function, the deviation of each pixel from its first N coordinates to altered first N coordinates and eliminating each pixel that is determined by said isometric function as hidden behind a frontal pixel; and
    D. coloring or shading said pixel, if said pixel is not eliminated in step C, according to a predetermined color pattern by which said scalar value conforms to a predetermined color or shading.

11. A method including two or three dimensions for displaying in an N-dimensional display means the $N+1^{st}$ dimension that is a function of the other first N variables in an equation of N+1 variables, comprising the following steps:
    A. computing, by means of said function, the scalar value of each pixel, whose N-coordinates represent the specific values of said first N variables; and
    B. coloring or shading said pixel according to a predetermined color pattern by which said scalar value conforms to a predetermined color or shading.

12. A system including two or three dimensions for displaying the $N+1^{st}$ dimension of an equation of N+1 variables in an N-dimensional display means, comprising:
    (a) interface means for receiving input concerning said equation;
    (b) conversion means for converting said equation into the form in which the $N+1^{st}$ dimension is a variable that is a function of the other first N variables;
    (c) computing means for computing, by means of said function, the scalar value of each pixel, whose N-coordinates represent the specific values of said first N variables;
    (d) coloring means for coloring or shading said pixel according to a predetermined color pattern by which said scalar value conforms to a predetermined color or shading; and
    (e) an N-dimensional display means comprising a display interface, or storage or transmittal means adapted to instruct such display interface, wherein, the color or shade of each pixel in said display means is determined by said coloring means.

13. A system including two or three dimensions for displaying the $N+1^{st}$ dimension of a first function of N+1 variables in an N-dimensional display means, comprising:
    (a) interface means for receiving input concerning said equation;
    (b) conversion means for converting said first function into the form by which the $N+1^{st}$ variable is a second function of the first N variables;
    (c) computing means for computing, by means of said second function, the scalar value of each pixel, whose N-coordinates represent the specific values of said first N variables;
    (d) coloring means for coloring or shading said pixel according to a predetermined color pattern by which said scalar value conforms to a predetermined color or shading; and
    (e) an N-dimensional display means comprising a display interface, or storage or transmittal means adapted to instruct such display interface, wherein, the color or shade of each pixel in said display means is determined by said coloring means.

14. A system including two or three dimensions for displaying the N+$2^{nd}$ dimension of an equation of N+2 variables in an N-dimensional display means, comprising:
 (a) interface means for receiving input concerning said equation;
 (b) conversion means for converting said equation into the form in which the N+$2^{nd}$ dimension is a variable that is a function of the other first N+1 variables;
 (c) first computing means for computing, by means of said function, the scalar value of each pixel, whose N+1 coordinates represent the specific values of said first N+1 variables;
 (d) second computing means for computing, by means of a predetermined isometric function, the deviation of each pixel from its first N coordinates to altered first N coordinates and eliminating each pixel that is determined by said isometric function as hidden behind a frontal pixel;
 (e) coloring means for coloring or shading said pixel according to a predetermined color pattern by which said scalar value conforms to a predetermined color or shading; and
 (f) an N-dimensional display means comprising a display interface, or storage or transmittal means adapted to instruct such display interface, wherein, the color or shade of each pixel, if said pixel is not eliminated by said second computing means, in said display means, is determined by said coloring means.

15. A system including two or three dimensions for displaying the N+$1^{st}$ dimension that is a function of the other first N variables in an equation of N+1 variables in an N-dimensional display means, comprising:
 (a) Interface means for receiving input concerning said equation;
 (b) computing means for computing, by means of said function, the scalar value of each pixel, whose N-coordinates represent the specific values of said first N variables;
 (c) coloring means for coloring or shading said pixel according to a predetermined color pattern by which said scalar value conforms to a predetermined color or shading; and
 (d) an N-dimensional display means comprising a display interface, or storage or transmittal means adapted to instruct such display interface, wherein, the color or shade of each pixel in said display means is determined by said coloring means.

16. A method as claimed in claim 1, wherein the function is convertible into the form in which the N +$1^{st}$ dimension is a variable that is a function of the other first N variables.

17. A method as claimed in claim 1, wherein the N display of the function is a two dimensional display.

18. A method as claimed in claim 1, wherein the N display of the function is a three-dimensional display.

19. A method as claimed in claim 1, wherein the function is a mathematical function.

* * * * *